United States Patent [19]
Yamamoto

[11] Patent Number: 6,025,964
[45] Date of Patent: Feb. 15, 2000

[54] OPTICAL APPARATUS

[75] Inventor: Haruhisa Yamamoto, Fujisawa, Japan

[73] Assignee: Canon Kabushiki Kaisha, Tokyo, Japan

[21] Appl. No.: 09/075,667

[22] Filed: May 11, 1998

[30] Foreign Application Priority Data

May 16, 1997 [JP] Japan ..................................... 9-143260
Jul. 15, 1997 [JP] Japan ..................................... 9-207230

[51] Int. Cl.$^7$ .............................. G02B 7/02; G02B 15/14; G02B 13/34
[52] U.S. Cl. .......................... 359/824; 359/696; 359/694; 396/133
[58] Field of Search .................................... 359/824, 696, 359/694; 396/133

[56] References Cited

U.S. PATENT DOCUMENTS 5,731,919 3/1998 Yamamoto ............................... 359/824

*Primary Examiner*—Georgia Epps
*Assistant Examiner*—Michael A Lucas
*Attorney, Agent, or Firm*—Robin, Blecker & Daley

[57] ABSTRACT

An optical apparatus includes an optical unit having an optical axis, a manual operation member arranged to be manually operated to drive the optical unit, a driving motor for electrically driving the optical unit, and a driven member arranged to be driven by the driving motor, wherein the manual operation member and the driven member are kept in contact with each other through a predetermined frictional force on a ring-shaped face whose center lies at the optical axis, and wherein a driving force of the driving motor is transmitted via the driven member to the manual operation member, while a manual driving force onto the manual operation member is not transmitted to the driven member.

8 Claims, 9 Drawing Sheets

OPTICAL APPARATUS

BACKGROUND OF THE INVENTION

1. Field of the Invention

The present invention relates to an optical apparatus having a power transmission mechanism advantageously arranged for moving optical means such as a photo-taking lens to be used for television shooting or the like.

2. Description of Related Art

An optical apparatus such as a photo-taking lens for television shooting or the like has been arranged to drive predetermined optical means with a driving force for zooming, focusing, adjustment of an iris, insertion and removal of a filter, etc.

In the case of a photo-taking lens adapted for television shooting, for example, a lens unit thereof is generally arranged to be driven by rotating an operation ring which is disposed on the outside of the lens unit in a state of being directly linked to the lens unit. The operation ring is arranged to be operated by the hand of a camera operator or driven by an electric motor responsive to the camera operator, according to shooting conditions. A drive unit which is provided for electrically driving the operation ring is disposed at a part of a lens barrel.

The drive unit includes various switches and a power transmission mechanism which is linked to the operation ring of the lens barrel. When some of the switches is operated by the camera operator, the electric motor is actuated to move the operation ring through the power transmission mechanism. When the lens unit is to be manually moved, the camera operator either rotates the operation ring directly by the hand or operates a lever provided on the operation ring to rotate the operation ring.

The operation ring of the photo-taking lens is thus arranged to be drivable either by hand or by an electric motor. Therefore, the power transmission mechanism included in the drive unit is thus arranged to be operated selectively in one of the two operation modes.

FIG. 6 shows the appearance of the conventional photo-taking lens. The photo-taking lens is composed of a lens body 1, a drive unit 2, a focus ring 3, a zoom ring 4 and an iris ring 5. FIG. 7 shows a television camera on which the above-stated photo-taking lens is mounted.

FIG. 8 shows a power transmission path obtained when a predetermined lens unit is to be driven by an electric motor 10 disposed within the drive unit 2. All elements other than a lens barrel and an operation ring 11 are disposed within the drive unit 2. An intermeshing toothed part 11a is formed on the outside of the operation ring 11 around the circumference thereof. A variable speed gear 12 is provided integrally with the electric motor 10. A sleeve 14 is secured to the output shaft 13 of the variable speed gear 12 with a pin 15. An output gear 16 of the variable speed gear 12 is mounted in such a way as to be rotatable with respect to the sleeve 14. A spring 18 is arranged to push the output gear 16 toward the sleeve 14 through a sliding washer 17.

Under a prescribed load torque, the output gear 16 and output shaft 13 rotate together. However, when the load torque becomes excessive, the sleeve 14 comes to serve as a torque limiter by slipping relative to the output gear 16 so that a force acting on a tooth face can be mitigated to prevent teeth from being damaged. This torque limiter mechanism gives an advantageous effect by absorbing an impact on the tooth face particularly when the lens unit comes to a stop upon arrival at an end of its action caused by high-speed driving.

An intermediate gear 19 is arranged between the output gear 16 and the operation ring 11 to be rotatable relative to a shaft 20 and to be slidable over the shaft 20, which holds the intermediate gear 19. The intermediate gear 19 has an intermeshing toothed part 19a formed on its outer circumferential side and in mesh with both the output gear 16 and the intermeshing toothed part 11a of the operation ring 11.

With the power transmission mechanism arranged in this manner, when the camera operator operates some of operation switches provided at the drive unit 2, a rotating force generated at the electric motor 10 is transmitted to the operation ring 11 through the output gear 16 of the variable speed gear 12 and the intermediate gear 19. As a result, the lens unit interlinked with the operation ring 11 is driven by the electric motor 10.

FIG. 9 shows an arrangement for manually driving the operation ring 11. In this case, a clutch plate 21 is caused to rotate by a clutch lever (not shown) when the clutch lever is operated by the camera operator. The clutch plate 21 is provided with a change-over pin 22, which is engaging the intermediate gear 19 as shown in FIG. 8. The intermediate gear 19 slides to the left over the shaft 20 accordingly as the clutch lever is operated. As a result, the intermediate gear 19 comes away from its position of intermeshing with the output gear 16. With the power transmission path between the driving motor 10 and the operation ring 11 cut off by operating the clutch lever in this manner, the lens unit can be manually driven either by operating the operation ring 11 directly by hand or by operating a lever which is provided on the operation ring.

For selective switching between the two modes of driving the lens unit, i.e., the electric driving mode and the manual driving mode, the position of the intermediate gear 19 which is located between the output gear 16 and the operation ring 11 to intermesh with both of them is shifted to bring the intermeshing toothed part 19a into an engaging position or into a disengaging position. The intermeshing toothed part 19a is generally formed, like a spur gear, on the outer circumferential side of the intermediate gear 19.

Further, the power transmission member which transmits power by intermeshing of gears and the torque limiter member which prevents toothed faces from being damaged by limiting a transmitting torque in the event of rotation under an overload condition are arranged respectively as discrete members within the power transmission mechanism which links the electric motor 10 with the operation ring 11.

With an optical apparatus having the conventional power transmission mechanism arranged in the above-stated manner, in electrically driving some lens unit included in a photo-taking lens, the intermediate gear 19 which is disposed between the output gear 16 of the electric motor 10 and the operation ring 11 intermeshes with both of two gears, i.e., with the output gear 16 of the motor 10 and the intermeshing toothed part 11a of the operation ring 11.

However, since gears generally have backlash at intermeshing parts, the backlash causes a time lag after the commencement of driving the electric motor 10 and before the operation ring 11 follows the electric motor 10. In cases where the operation ring 11 is instantly driven to rotate by driving the motor 10 at a high speed, the time lag presents no serious problem. However, in the event of a slow zooming, fine lens position adjustment or the like, the time lag before the lens unit actually begins to act after a command for driving the lens unit is issued by the camera operator brings about a serious problem. In such a case, it might be impossible to take pictures as desired by the camera operator.

For driving the lens unit, therefore, it is desired to minimize the backlash of the gear train arranged between the electric motor 10 and the operation ring 11. Further, since the selective switching between the electric driving mode and the manual driving mode is performed by the operation of the clutch lever, much time is required for the selective switching, and operability is not necessarily good. Further, the torque limiter member which limits a torque transmitted in the event of rotation under an overload condition and the power transmission member which transmits power by intermeshing of gears are arranged as discrete members around the lens barrel independently of each other. Therefore, the arrangement increases the number of necessary parts, which occupy a large space within the drive unit and make the structural arrangement of the drive unit complex to hinder reduction in size and cost.

Further, as technical art related to the invention, there are U.S. patent applications Ser. No. 08/745,842 filed Nov. 12, 1996, and Ser. No. 09/040,779 filed Mar. 18, 1998.

BRIEF SUMMARY OF THE INVENTION

It is an object of the invention to provide an optical apparatus wherein a power transmission mechanism which is provided for driving optical means held within a casing either by manually driving an operation ring or by transmitting a rotating force of an electric motor to the optical means is arranged to minimize a time lag before actuation of the optical means by appositely arranging the power transmission mechanism to lessen backlash.

It is another object of the invention to provide an optical apparatus wherein a lens unit can be either manually or electrically driven, without requiring any switching operation that is conventionally required for selection of a manual driving mode or an electric driving mode, and the structural arrangement of a torque limiter mechanism which limits a transmission torque in the event of an overloaded rotation is simplified to permit reduction in size and simplification of the apparatus as a whole. Another advantage lies in that the torque of transmission is arranged according to the invention to be variable as desired, so that the operation torque of a manual operation is also variable.

To attain the above objects, in accordance with an aspect of the invention, there is provided an optical apparatus, which comprises an optical unit having an optical axis, a manual operation member arranged to be manually operated to drive the optical unit, a driving motor for electrically driving the optical unit, and a driven member arranged to be driven by the driving motor, wherein the manual operation member and the driven member are kept in contact with each other through a predetermined frictional force on a ring-shaped face whose center lies at the optical axis, and wherein a driving force of the driving motor is transmitted via the driven member to the manual operation member, while a manual driving force onto the manual operation member is not transmitted to the driven member.

These and other objects and features of the invention will become apparent from the following detailed description of embodiments thereof taken in connection with the accompanying drawings.

DETAILED DESCRIPTION OF THE INVENTION

Hereinafter, preferred embodiments of the invention will be described in detail with reference to the drawings.

Figure 1:
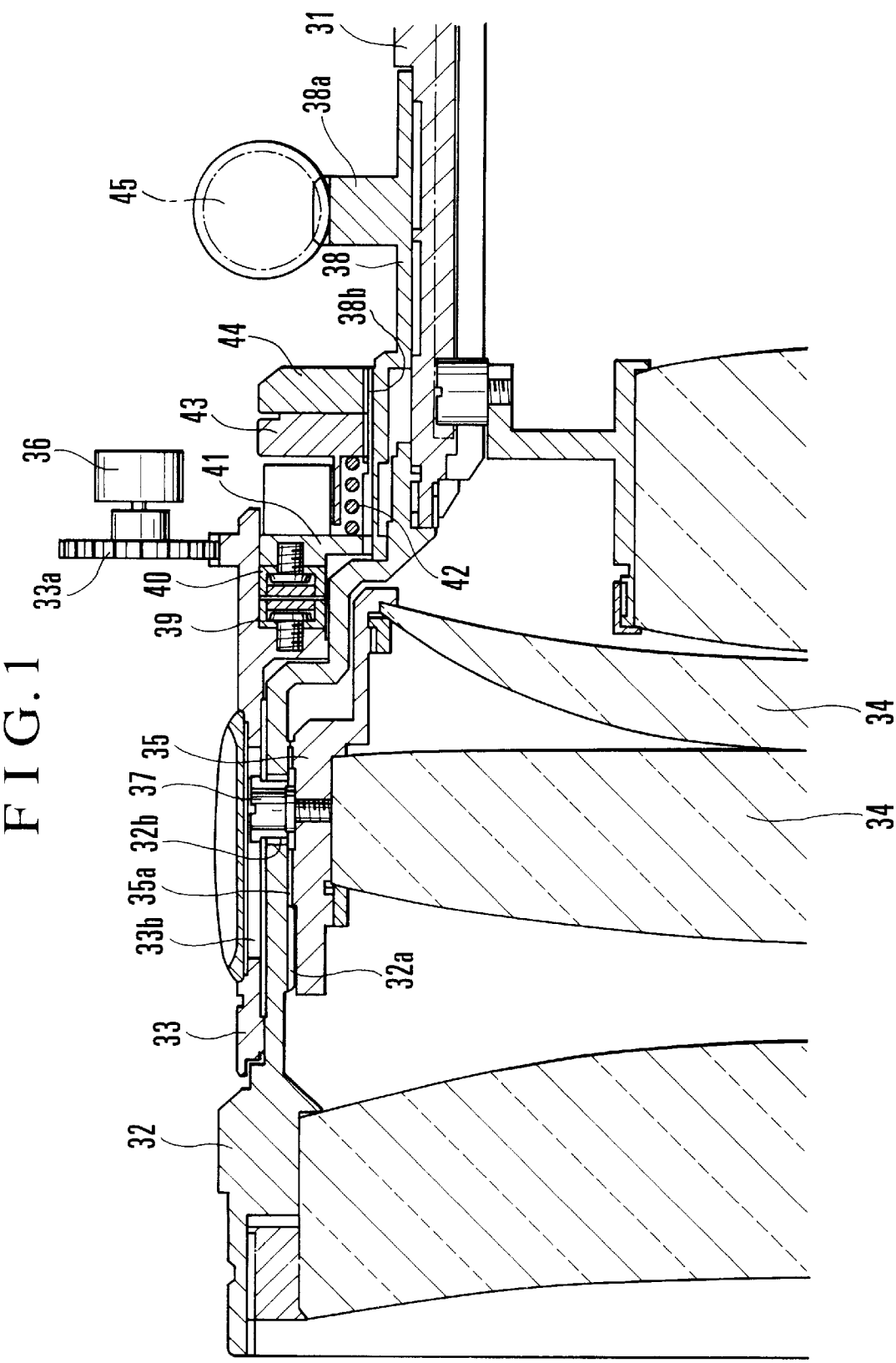
FIG. 1 is a sectional view showing essential parts of a lens barrel which is an optical apparatus according to a first embodiment of the invention.

FIG. 1 is a sectional view showing essential parts of a lens barrel which is an optical apparatus according to a first embodiment of the invention. Referring to FIG. 1, a focusing part of the lens barrel includes a friction clutch serving as a transmission torque limiting means, a worm gear and a DC motor. A base tube 32 is connected to a fixed lens base 31 with screws. On the outer circumferential side of the base tube 32, there is provided a focusing operation ring 33 serving as a manual operation means arranged to be manually operated. On the inner circumferential side of the base tube 32, a focusing tube 35 which carries a focusing lens 34 is coupled with the base tube 32 through helicoid screws 32a and 35a.

The focusing operation ring 33 serving as the manual operation means has a fitting engagement part in the base tube 32 and is arranged to be rotatable around an optical axis. The camera operator is allowed to perform a manual operation through the focusing operation ring 33. The focusing operation ring 33 is provided with a position sensor 36, which is composed of an encoder or a potentiometer and is connected to the focusing operation ring 33 through a gear 33a.

A connection pin 37 for transmitting a rotation force of the focusing operation ring 33 to the focusing tube 35 is mounted on the focusing tube 35. The connection pin 37 is inserted into a rectilinear slot 33b formed in the operation ring 33 and a cam slot 32b formed in the base tube 32. The focusing tube 35 can be smoothly moved in the direction of the optical axis through the helicoid screws 32a and 35a according to the rotation of the operation ring 33 caused by the manual driving or the electric driving.

An output tube 38 which fittingly engages the lens base 31 and the base tube 32 is arranged to support a part of the transmission torque limiting means and to be rotatable relative to the lens base 31 and the base tube 32. Further, the output tube 38 is provided with a worm wheel 38a.

Figure 2:
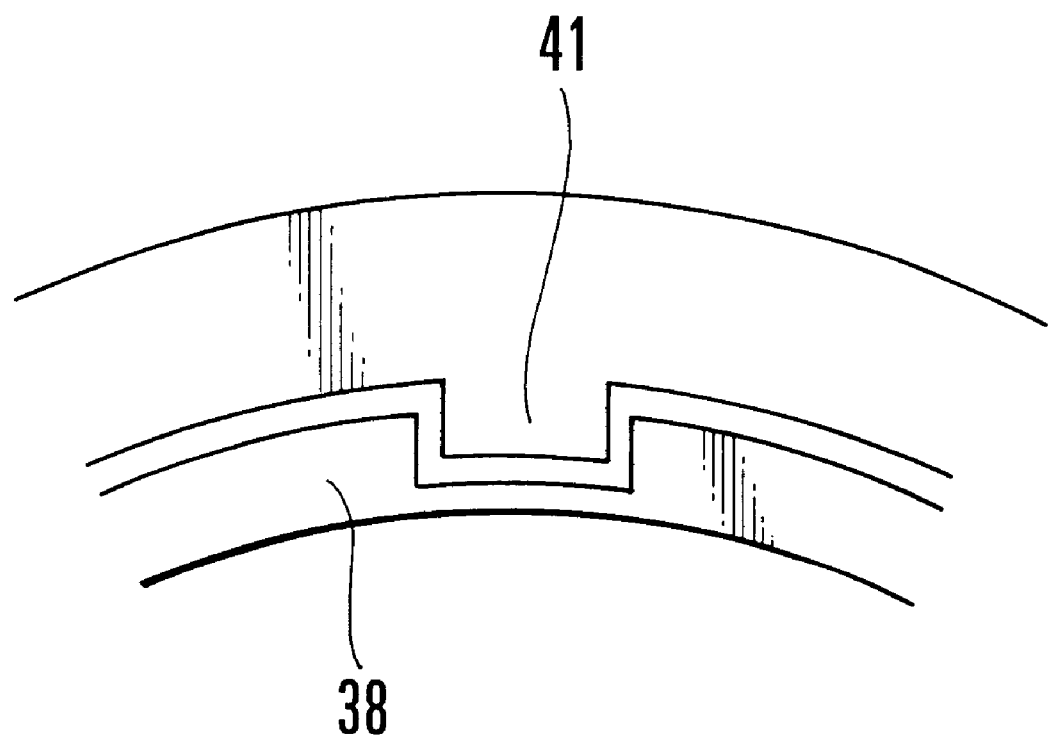
FIG. 2 shows the intermeshing state of an output tube and a support plate in the lens barrel shown in FIG. 1.

Friction plates 39 and 40 serving as the transmission torque limiting means are disposed oppositely to each other between the operation ring 33 and the output tube 38. The friction plate 40 is supported by a support plate 41 which is movable in the direction of the optical axis relative to the output tube 38 and which has a restricting portion in the rotating direction, as shown in FIG. 2, so as to rotate integrally with the output tube 38. The support plate 41 is pushed jointly by a spring 42 serving as a pushing means for generating a frictional force, a pushing force adjusting ring 43 which supports the spring 42 and adjusts its pushing force by adjusting the length of the spring 42 and a screw 38b which is provided on the output tube 38. A nut 44 is arranged to act as a double nut for fixing the pushing force adjusting ring 43 in position.

Each of the parts from the friction plate 39 to the nut 44 is arranged to be or approximately to be in a ring shape which extends in the circumferential direction of a casing and is coaxial with the optical axis. These parts 39 to 44 are thus disposed on the circumference of the lens base 31 around the optical axis. Such an arrangement permits effective use of space and reduction in size of the apparatus as a whole. Further, all parts of the system of the transmission torque limiting means are directly connected to each other without gears or the like, so that any instability and time lag that otherwise take place from backlash or the like are precluded.

The transmission torque limiting means is provided for transmitting a driving force from a worm 45 mounted on a driving means which is composed of an electric motor connected to the operation ring 33 through the worm wheel 38a and the output tube 38. For a load torque larger than a predetermined load torque, the transmission torque limiting means is arranged to make a slip between the friction plates 39 and 40. A predetermined friction torque can be generated by adjusting the spring length of the spring 42. This friction torque is determined by the coefficient of friction of the friction plates 39 and 40 or by selecting their material. More specifically, with the coefficient of friction between the friction plates 39 and 40 assumed to be δ, an adequate operation force can be obtained by setting the coefficient of friction at a value which can be expressed as $0.2<\delta<0.5$.

Further, some viscous fluid may be applied to a sliding part between the friction plates 39 and 40 for improving a manual operation feeling.

In driving the operation ring 33 by the electric driving means, an output from the electric motor which is a drive source and the worm 45 is transmitted to the operation ring 33 through the worm wheel 38a, the output tube 38 and the transmission torque limiting means. The rotation of the operation ring 33 is then transmitted to the focusing tube 35 through the connection pin 37 which pierces through the rectilinear slot 33b and the cam slot 32b. As a result, the focusing tube 35 is moved in the direction of the optical axis by the helicoid screws 32a and 35a, thereby adjusting focus.

In the case of the manual driving, when the operation ring 33 is manually rotated, a driving force which is transmitted from the operation ring 33 to the electric driving means is limited by the slipping of the friction plate 40 relative to the other friction plate 39. In other words, since the worm gear composed of the worm 45 and the worm wheel 38a is arranged to be incapable of backward driving, the slipping occurs between the friction plates 39 and 40, so that a good feeling of a focusing operation can be attained. Further, the pushing force of the spring 42 can be set as desired by adjusting the length of the spring 42 by turning the pushing force adjustment ring 43 and fixing it with the nut 44.

Further, even when some force is applied from outside to the operation ring 33 during the electric driving, no excessive force is applied to the mechanism system, because the transmission torque limiting means does not transmit any load torque that exceeds a predetermined torque. Therefore, the arrangement of the first embodiment obviates the necessity of any mechanism for switching between the electric driving mode and the manual driving mode, so that the focusing lens 34 can be selectively driven with a simple mechanism either in the manual driving mode or in the electric driving mode.

In the first embodiment, where a torque required for driving the members located between the transmission torque limiting means and the focusing lens 34 is assumed to be TL and a maximum torque transmissible by the transmission torque limiting means is assumed to be TF, each of the elements is set so as to satisfy a condition of TL<TF. In addition, the worm gear composed of the worm 45 and the worm wheel 38a is arranged to be not rotatable from the side of the worm wheel 38a. With a critical torque up to which the worm gear can remain in repose assumed to be TM, the torque TM can be set either larger than the torque TF or at an infinity value against any attempt to rotate the worm gear from the side of the worm wheel 38a.

In a case where the torque TL is caused to vary by changes in the environment or in the rotating speed of the manual operation means or in a case where the torques TF and TM are caused to vary by changes in the environment or the like, each element must be set in such a way as to retain the above-stated inequality over a predetermined range of such changes of condition. By that arrangement, the manual driving mode and the electric driving mode can be switched from one over to the other without any special selecting operation. Further, in the case of the manual driving mode, the operation ring 33 is rotated with an actuating torque of TL+TF.

As described above, according to the arrangement of the first embodiment, the rotating torque of the electric driving means can be reliably transmitted to the driven side in electrically driving the operation ring 33. In manually driving the operation ring 33, the use of a mechanism such as the worm gear arranged to be incapable of backward driving enables the operation torque of the operation ring 33 to be determined by a frictional rotation torque generated by the transmission torque limiting means and the actuation torque resulting from the motion of the focusing lens 34.

That arrangement not only gives a stable rotation torque of the transmission torque limiting means but also permits obtaining a desired rotation torque by adjusting the spring length of the spring 42. Further, the electric driving means can be protected against an overload and reverse driving taking place on the driven side. The structural arrangement of the transmission torque limiting means is very simple and does not require much space. The transmission torque limiting means, therefore, can be disposed close to the operation ring 33 and thus contributes to reduction in size and cost. Further, the use of the worm gear not only permits more effective use of space than use of a gear train but also ensures very good response as backlash is minimized thereby.

In the first embodiment described above, the worm gear is used for preventing reverse rotation. The worm gear, however, may be replaced, for example, with some speed reducer that is arranged to eventually have an extremely large reverse rotation torque. Such a speed reducer may be selected from among speed reducers including a speed reducer having a large reduction ratio with a planet gear, a spur gear, etc., arranged in a multiple stage, a speed reducer having either no backlash or a minimal backlash with gears arranged to have urging forces on each other, and a speed reducer having a differential mechanism.

Figure 3:
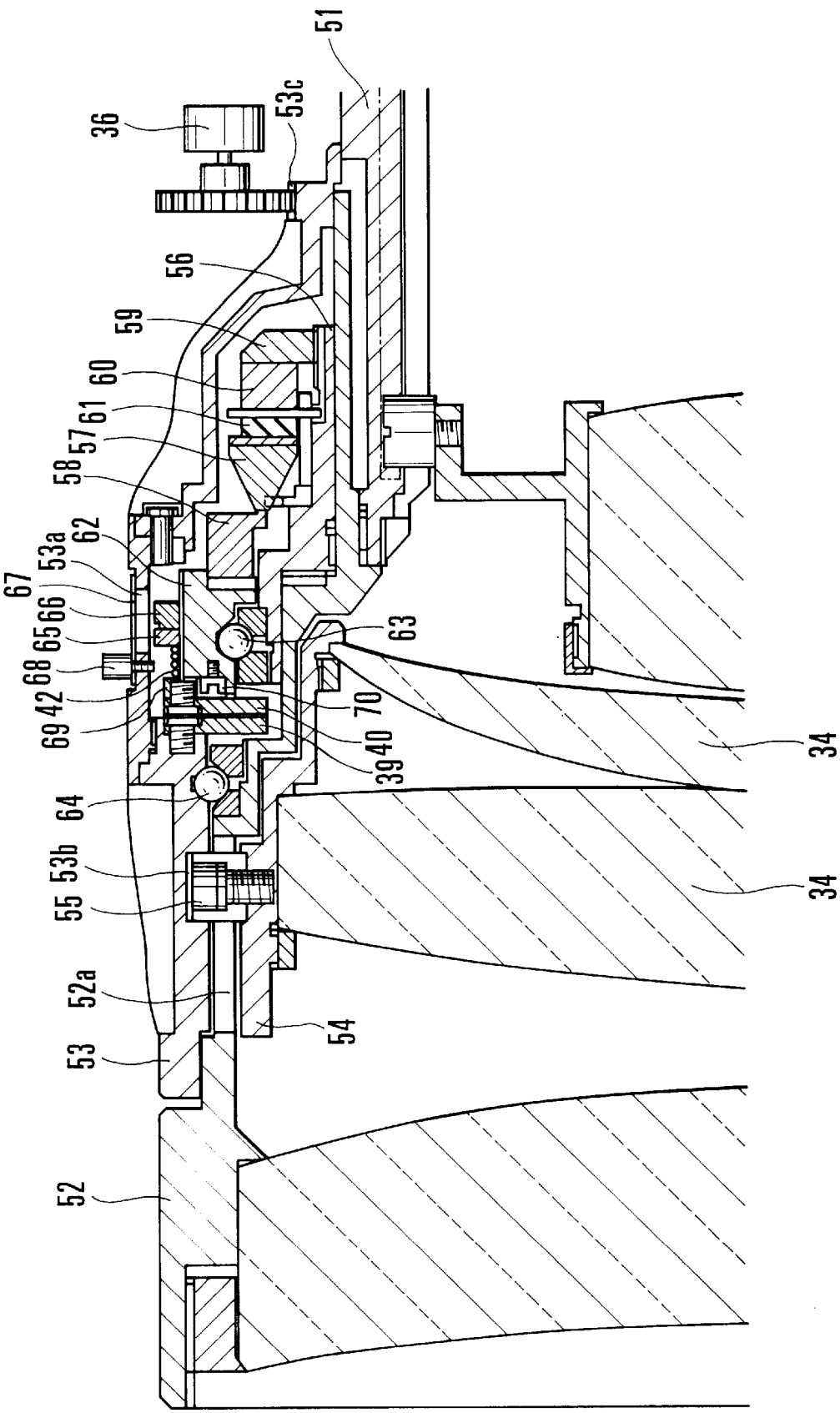
FIG. 3 is a sectional view showing essential parts of a lens barrel which is an optical apparatus according to a second embodiment of the invention.

FIG. 3 is a sectional view showing essential parts of a lens barrel which is an optical apparatus according to a second embodiment of the invention. In the second embodiment, a transmission torque limiting means and a vibration wave motor are disposed in a focusing part. In FIG. 3, the parts and members of the second embodiment arranged in the same manner as those of the first embodiment are indicated by the same reference numerals as those used for the first embodiment. In a base tube 52 which is connected to a lens base 51 with screws, there are formed three rectilinear cams 52a extending in parallel with the optical axis. A focusing operation ring 53 serving as a manual operation means engages the rectilinear cams 52a. The operation ring 53 is provided with a pushing force adjustment hole 53a. A focusing lens 34 is held by a focusing tube 54. The outer circumferential part of the focusing tube 54 engages the rectilinear cams 52a of the base tube 52. The focusing tube 54 also engages curved cams 53b of the operation ring 53 through three connection pins 55. The focusing tube 54 is thus arranged to be smoothly movable in the direction of the optical axis through the connection pins 55, the rectilinear cams 52a of the base tube 52 and the curved cams 53b of the operation ring 53 according to the rotation of the operation ring 53 caused by the manual driving or the electric driving.

A vibration wave motor composed of a stator 57 and a rotor 58 is provided on a driving unit base 56 and is arranged to generate a rotating force. A Belleville spring 60 is disposed between the stator 57 and the rotor 58 to generate a suitable frictional force between the stator 57 and the rotor 58. A shock absorbing rubber piece 61 is disposed between the stator 57 and the Belleville spring 60 to prevent the vibration of the rotor 58 from being transmitted to a drive transmission system.

Further, to prevent the pushing force of the Belleville spring 60 from affecting the drive transmission system, an output tube 62 is mounted on the driving unit base 56 by using a ball race 63 in such a way as to make the output tube 62 smoothly rotatable. The operation ring 53 is mounted on the base tube 52 also to be smoothly rotatable through a ball race 64 and is provided with some loose fitting parts on the base tube 52 and the lens base 51.

Like in the case of the first embodiment shown in FIG. 1, the second embodiment includes the transmission torque limiting means composed of the friction plates 39 and 40 serving as a transmission system and the spring 42 arranged to generate a frictional force. A pushing force adjustment ring 65 is arranged to be rotatable to suitably set the pushing force of the spring 42 by changing the length of the spring 42. A nut 66 is arranged to be used for fixing the pushing force adjustment ring 65 in position. A cover 67 is arranged to hide an adjustment ring setting hole 53a and is fixed in position with a screw 68. An output member 69 arranged for the transmission torque limiting means including the friction plate 40 is fitted into the output tube 62 to fit the faces of the friction plates 39 and 40 on each other and is fixed to the output tube 62 with a pin 70 so as to rotate together with the output tube 62. The operation ring 53 is arranged to be caused to rotate through the transmission torque limiting means when the output member 69 is rotated by the driving means which operates by utilizing vibration waves. The rotation of the operation ring 53 is transmitted to the focusing tube 54 through the connection pin 55 to move the focusing lens 34. A position sensor 36 is connected to the operation ring 53 through a gear 53c.

The stator 57 which constitutes the vibration wave motor is composed of a ring-shaped member having a trapezoid sectional shape. A piezoelectric ceramic piece of such a property that expands and shrinks in the direction of applying a voltage is bonded to the bottom face of the ring-shaped member. The upper part of the stator 57 is provided with projections of strictly regular shape. The rotor 58 is pushed against the stator 57 by a certain force of a ring, which is arranged to be in a flange-like shape and to be in contact with the stator 57 at its resilient contact part.

In the case of the second embodiment, the surface of the stator 57 which is an elastic body is caused to vibrate. The rotor 58 which is in pressed contact with the stator 57 is caused to continuously rotate by the vibration energy of the stator 57. Driving means is arranged in this manner. Such a driving means has an extremely simple structure, has a quick response for start and stop, has a high controllability, has a very quiet operating sound, and has a large holding torque for remaining in repose when it is at rest.

The force of keeping the rotor 58 in pressed contact with the stator 57 is obtained by means of the Belleville spring 60. The ball race 63 is arranged to offset this force, so that the transmission system can be prevented from being affected by the force. However, this holding method may be replaced with some other suitable method, such as a structural arrangement using a thrust bearing or a radial bearing. It is also conceivable to utilize the Belleville spring 60 of the vibration wave motor for the pushing means as a part of the transmission torque limiting means.

In case of the manual driving mode, when the operation ring 53 is manually rotated, the driving force transmitted from the operation ring 53 to the electric driving means is restricted by a slip torque generated between the friction plates 39 and 40. Since the driving means using vibration waves requires a large torque for back driving, the friction plate 39 of the transmission torque limiting means slips over the friction plate 40 to allow a focusing operation with a good feeling of operation.

Further, even when some force is applied from outside to the operation ring 53 during the electric driving, no excessive force is applied to the mechanism system, because the transmission torque limiting means does not transmit any load torque that exceeds a predetermined torque. Therefore, the arrangement of the second embodiment obviates the necessity of any mechanism for switching between the electric driving mode and the manual driving mode, so that the focusing lens 34 can be selectively driven with a simple mechanism either in the manual driving mode or in the electric driving mode.

In the case of the second embodiment, where a torque required for driving the members located between the transmission torque limiting means and the focusing lens 34 is assumed to be TL, a maximum torque transmissible by the transmission torque limiting means is assumed to be TF and a critical (maximum) torque for retaining a driving system including the above driving means in repose against a driving force applied from its output side is assumed to be TM, each of the elements is set so as to satisfy a condition of TL<TF<TM. In addition, a large holding torque of the vibration wave motor can be set to greatly contribute to the maximum torque TM. Therefore, it is not necessary to add any special reverse-rotation preventing means, i.e., any means for preventing the driving system (including the electric motor driving means) from being caused to rotate from the output side thereof.

In a case where the torque TL is caused to vary by changes in the environment or in the rotating speed of the manual operation means or in a case where the torques TF and TM are caused to vary by changes in the environment or the like, each element must be set in such a way as to retain the above-stated inequality over a predetermined range of such changes of condition. By that arrangement, the manual driving mode and the electric driving mode can be switched from one over to the other without any special selecting operation. Further, in the case of the manual driving mode, the operation ring 53 is rotated with an actuating torque of TL+TF.

According to the arrangement of the second embodiment described above, in electrically driving the operation ring 53, the rotation torque of the electric driving means can be reliably transmitted to the driven side. In manually driving the operation ring 53, the use of an element which requires a large torque for backward driving such as the vibration wave motor for the electric driving means enables the operation torque of the operation ring 53 to be determined by a frictional rotation torque generated by the transmission torque limiting means and the actuation torque resulting from the motion of the focusing lens 34.

Further, according to the conventional arrangement, the focusing lens 34 tends to move by its own weight when the posture of the lens barrel slants. However, the use of the worm gear which cannot be driven backward as in the case of the first embodiment or the use of the electric driving means such as the vibration wave motor which requires a large torque for backward driving as in the case of the second embodiment effectively prevents the focusing lens 34 from moving by its own weight.

Figure 4:
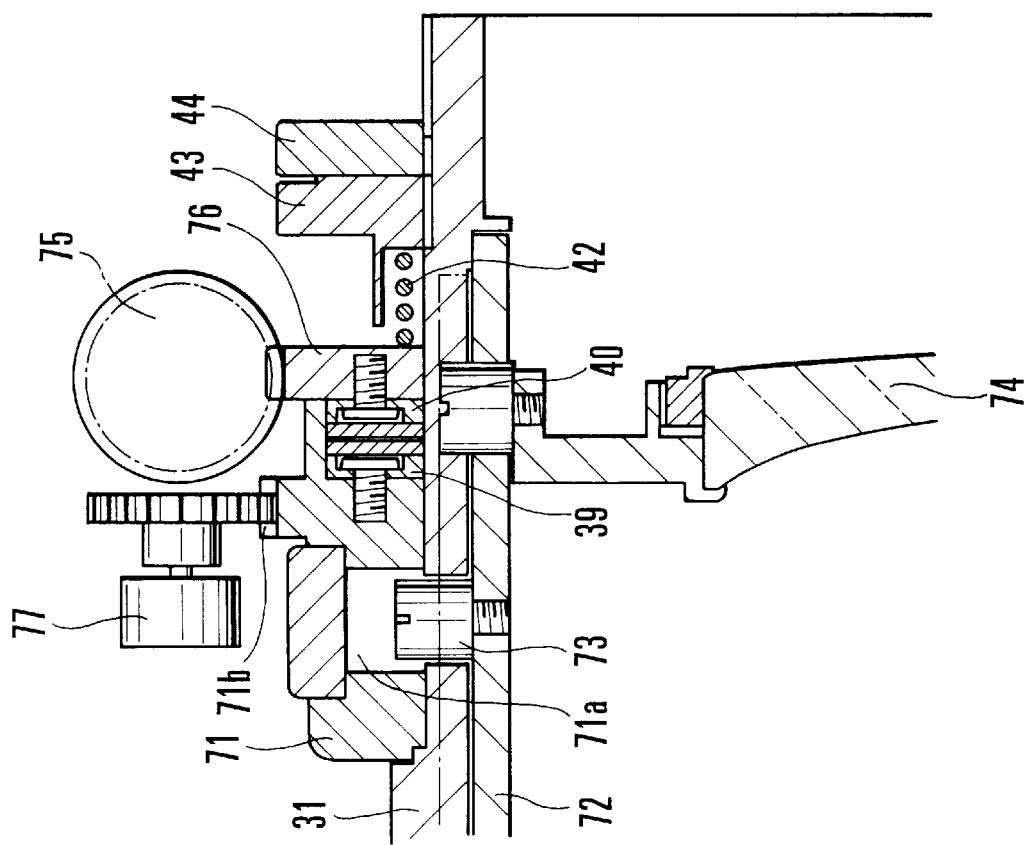
FIG. 4 is a sectional view showing essential parts of a lens barrel which is an optical apparatus according to a third embodiment of the invention.

FIG. 4 is a sectional view showing essential parts of a lens barrel which is an optical apparatus according to a third embodiment of the invention. In FIG. 4, reference numerals which are same as those used for first and second embodiments denote the same members. A zoom part of the lens barrel includes a transmission torque limiting means, a worm gear and a DC motor. A zooming operation ring 71 serving as a manual operation means is disposed on an outer circumferential part of the lens base 31. The operation ring 71 has a fitting engagement part arranged on the side of the lens base 31 and is rotatable freely.

A connection pin 73 is arranged to transmit the rotation force of the operation ring 71 to a cam ring 72. The pin 73 is mounted on the cam ring 72 and is fitted into a cam slot 71a formed in the operation ring 71. The cam ring 72 is arranged to cause a lens unit 74 composed of a variator lens part and a compensator lens part to smoothly move in the direction of an optical axis according to the rotation of the operation ring 71 caused by the manual driving or the electric driving. The DC motor which is a drive source is connected to the transmission torque limiting means which is similar to those of the first and second embodiments through a worm gear composed of a worm 75 and a worm wheel 76. The transmission torque limiting means is arranged between the worm wheel 76 and the operation ring 71 to slip for a load torque exceeding a predetermined load torque in the same manner as in the cases of the first and second embodiments. Further, a position sensor 77 is connected to the operation ring 71 through a gear 71b.

With the third embodiment arranged in the above manner, in driving the zooming operation ring 71 by the electric driving means, an output from the DC motor and the worm 75 is transmitted as a rotating force of the worm wheel 76 to the operation ring 71 through the transmission torque limiting means. Then, the rotation of the rotation ring 71 is transmitted to the cam ring 72 through the connection pin 73. As a result, the lens unit 74 which has an engaging member arranged to engage a rectilinear cam of the lens base 31 and a curved cam of the cam ring 72 is moved in the direction of the optical axis to vary magnification.

In the case of the manual driving mode, when the operation ring 71 is manually rotated, a slip takes place at the transmission torque limiting means, because the transmission mechanism using the worm gear is arranged to inhibit backward driving. Then, in the same manner as in the case of the electric driving mode, the lens unit 74 is driven for zooming adjustment. Further, even when a force is exerted on the operation ring 71 from outside during the electric driving, a slip takes place at the transmission torque limiting means when the external force exceeds a predetermined torque. Therefore, the mechanism of the lens barrel never receives any excessive force. The third embodiment is thus arranged to be capable of selectively driving the lens unit 74 either in the manual driving mode or in the electric driving mode without necessitating any mechanism for switching between the manual driving and the electric driving, so that the mechanism of the third embodiment can be simply arranged.

According to the arrangement of the third embodiment described above, the rotation torque of the driving means can be reliably transmitted to the driven side in the mode of electrically driving the operation ring 71. In the manual driving mode, the use of the worm gear or the like which does not permit backward driving as a means for transmitting the rotation torque of the driving means, the operation torque of the operation ring 71 is determined by the rotation torque generated by the transmission torque limiting means and the actuating torque resulting from the lens moving motion of the lens unit 74.

Figure 5:
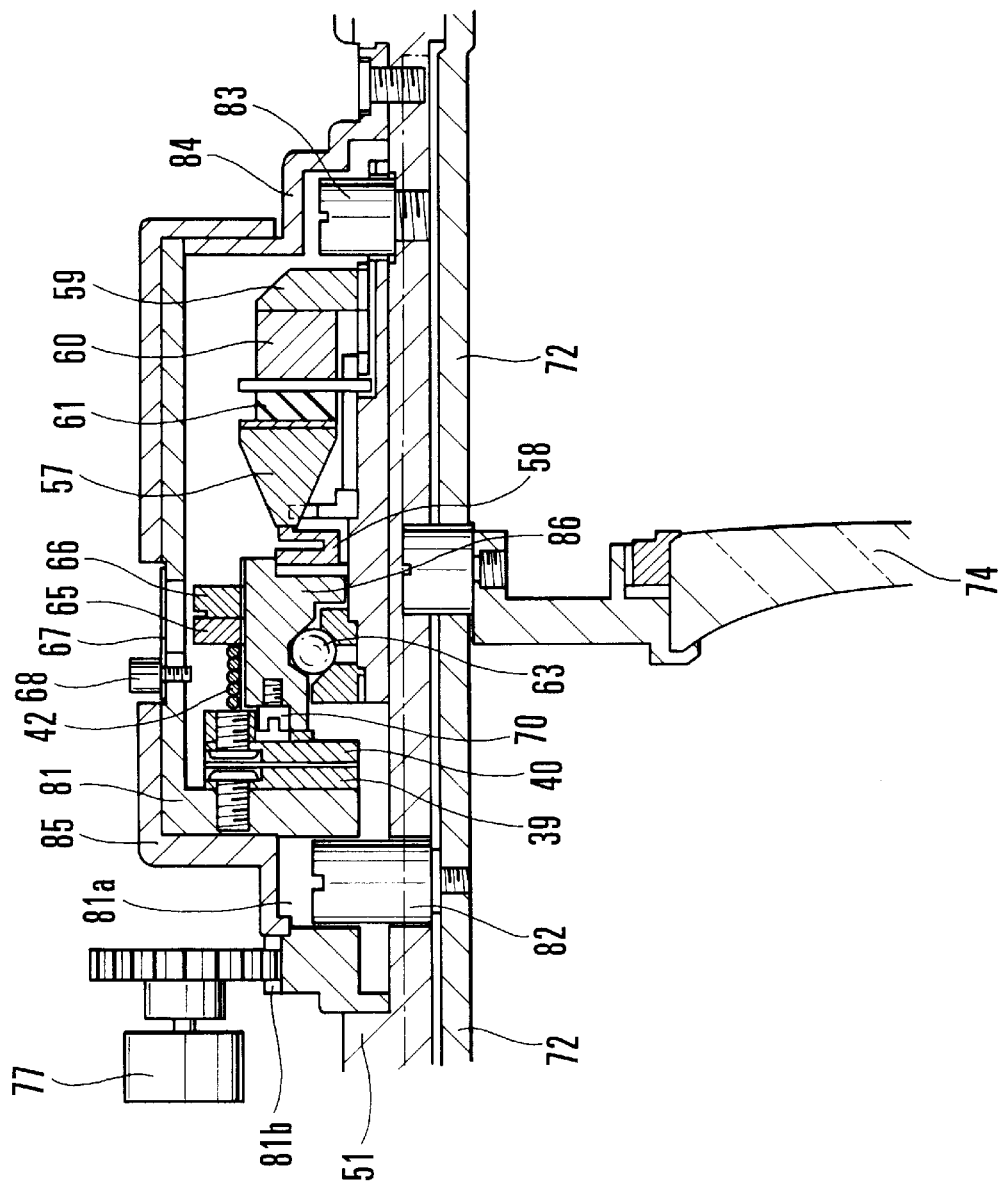
FIG. 5 is a sectional view showing essential parts of a lens barrel which is an optical apparatus according to a fourth embodiment of the invention.
Figure 6:
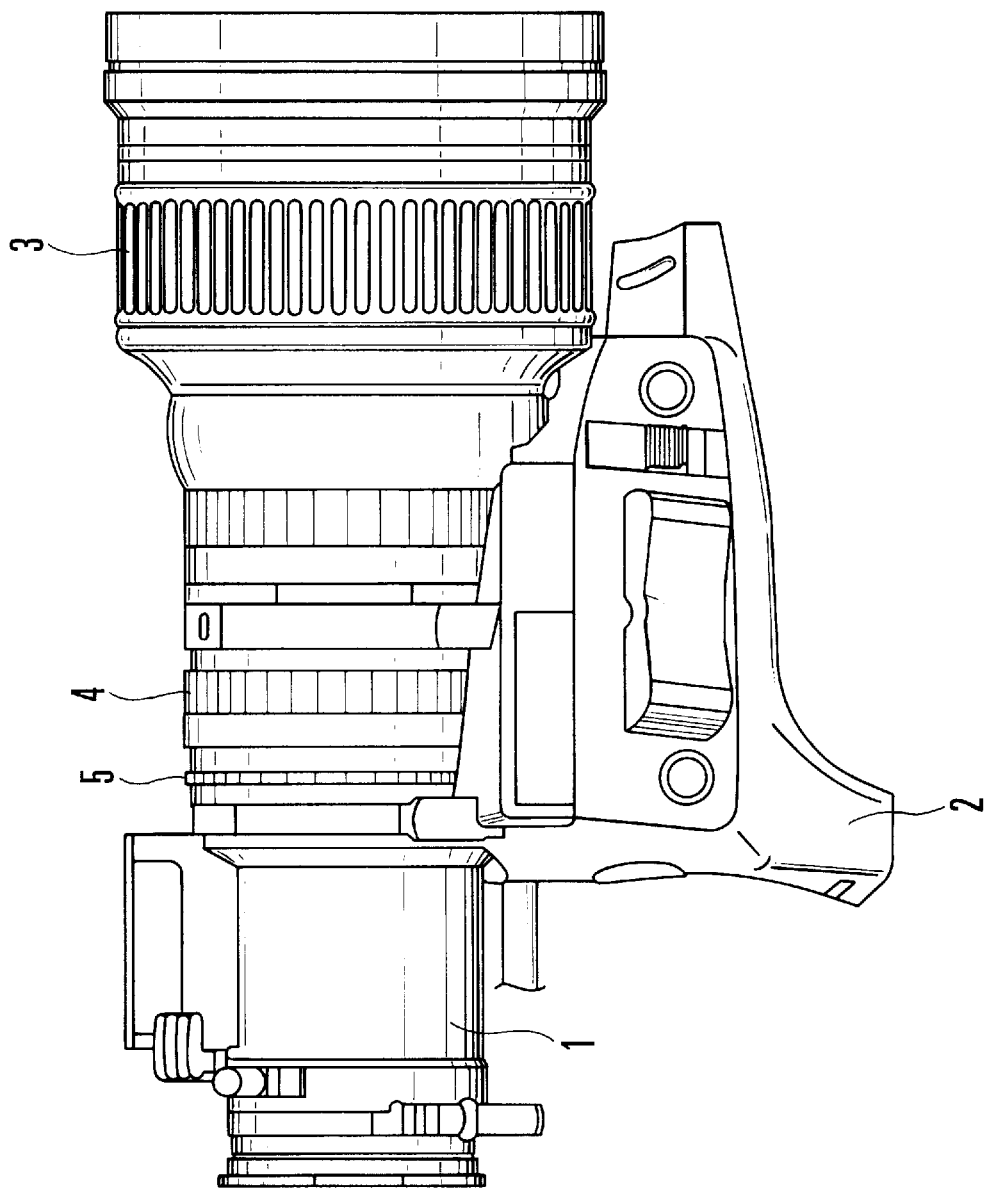
FIG. 6 shows the appearance of the conventional photo-taking lens.
Figure 7:
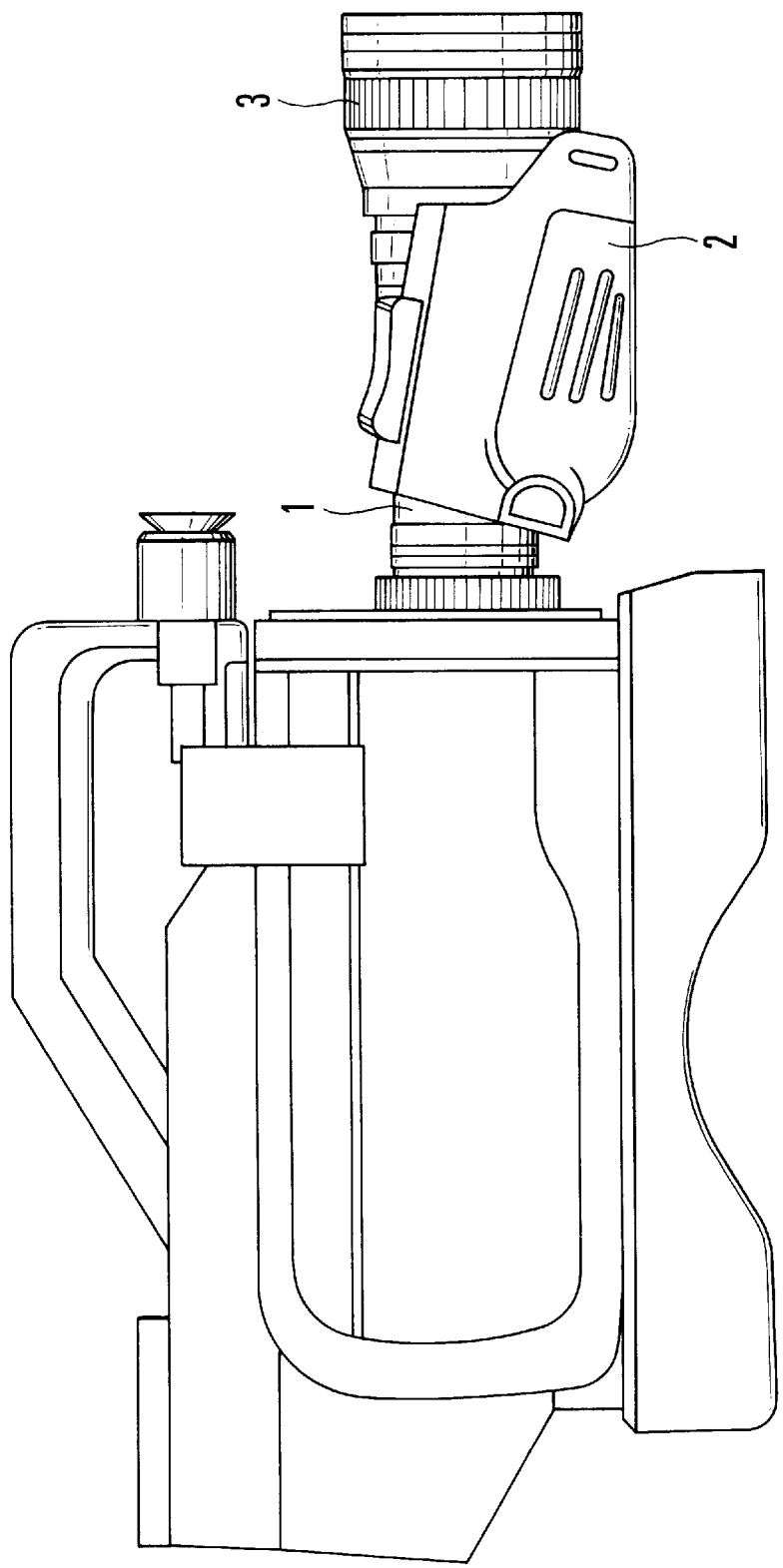
FIG. 7 shows the arrangement of a video camera on which the conventional photo-taking lens is mounted.
Figure 8:
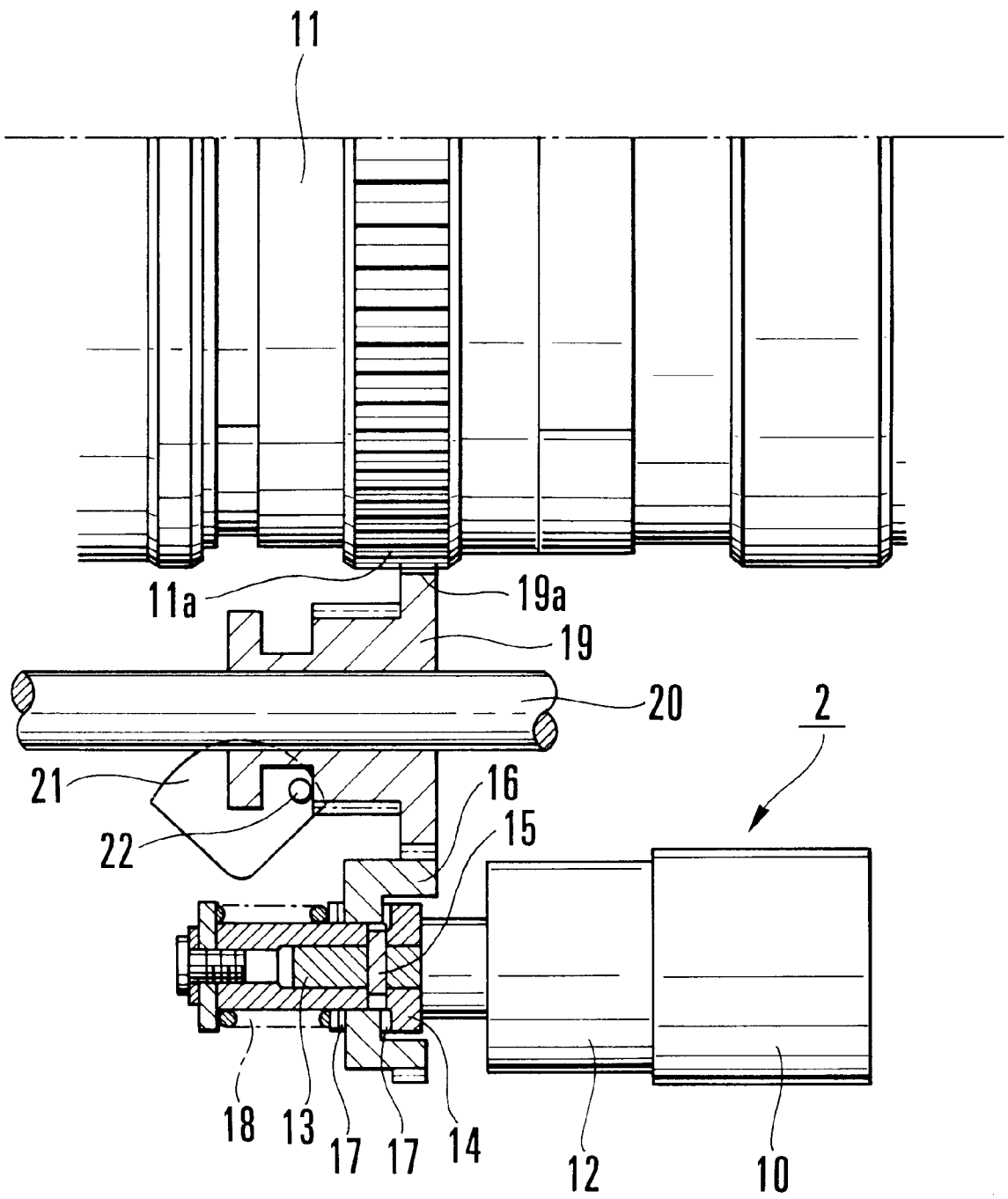
FIG. 8 shows the arrangement of essential parts of a lens barrel of the conventional photo-taking lens.
Figure 9:
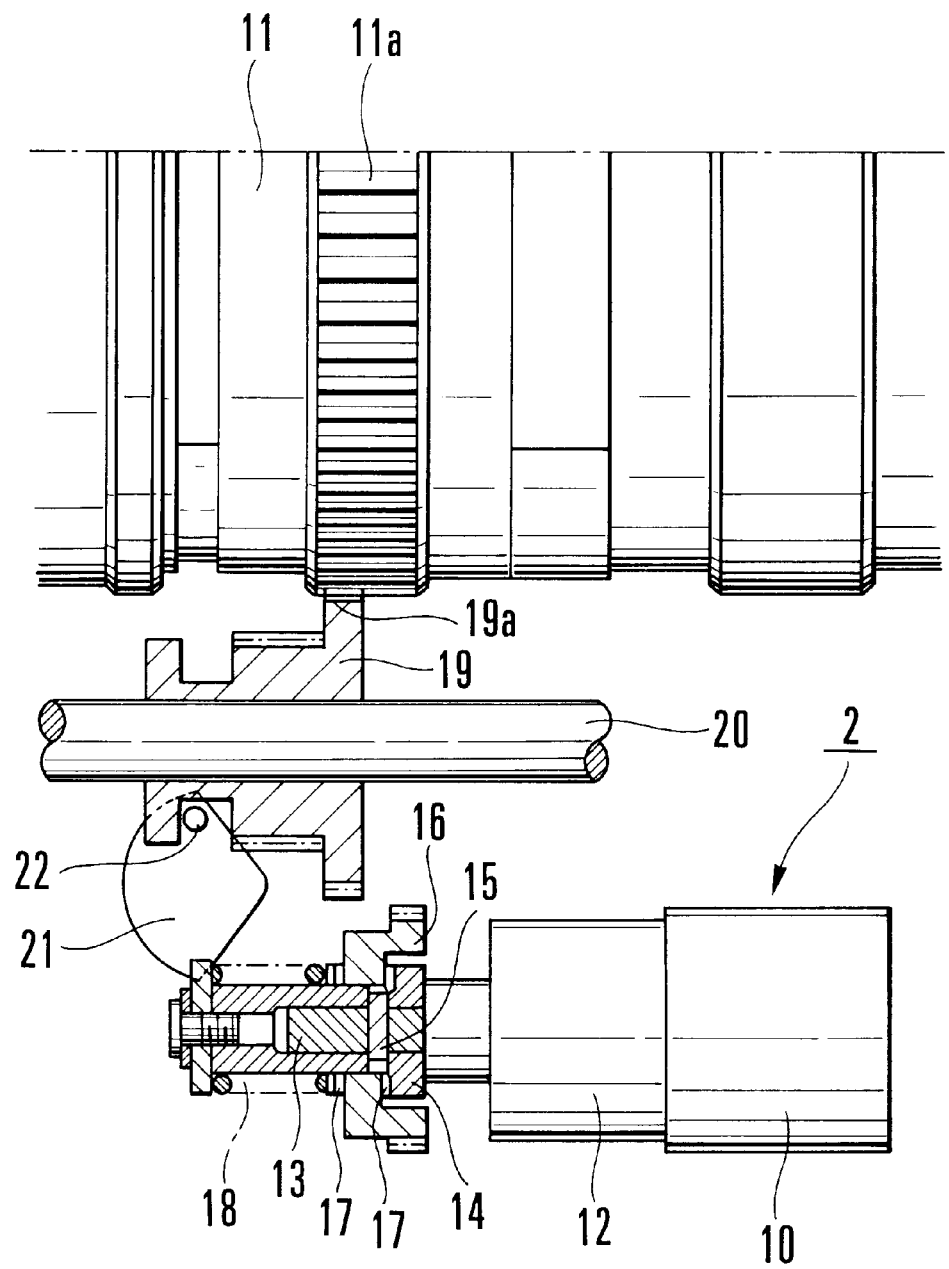
FIG. 9 shows the arrangement of essential parts of a lens barrel of the conventional photo-taking lens.

FIG. 5 is a sectional view showing essential parts of a lens barrel which is an optical apparatus according to a fourth embodiment of the invention. In the fourth embodiment, a transmission torque limiting means and a vibration wave motor are used for a zoom part. In FIG. 5, the same reference numerals as those used for the first, second and third embodiments denote the same members. A zooming operation ring 81 serving as a manual operation means is arranged on an outer circumferential part of the lens base 51. The operation ring 81 has a fitting engagement part arranged on the side of the lens base 31 and is rotatable freely.

A connection pin 82 is arranged to transmit the rotation force of the operation ring 81 to a cam ring 72. The connection pin 82 is mounted on the cam ring 72 and is fitted into a cam slot 81a formed in the operation ring 81. The cam ring 72 is arranged to cause a lens unit 74 to smoothly move in the direction of an optical axis according to the rotation of the operation ring 71 caused by the manual driving or the electric driving. Further, a restricting pin 83 is provided for restricting the rotation of the vibration wave motor. These parts are covered with covers 84 and 85.

The transmission torque limiting means which is similar to those of the first to third embodiments is arranged between an output member 86 of the vibration wave motor and the operation ring 81 to make a slip against a load torque exceeding a predetermined load torque. Further, a position sensor 77 is connected to the operation ring 81 through a gear 81b.

With the fourth embodiment arranged in the above manner, in driving the operation ring 81 by the electric driving means, an output from the vibration wave motor composed of a stator 57 and a rotor 58 is transmitted as a rotating force of the output member 86 to the operation ring 81 through the transmission torque limiting means. Then, the rotation of the rotation ring 81 is transmitted to the cam ring 72 through the connection pin 82. As a result, the lens unit 74 which has an engaging member engaging a rectilinear cam of the lens base 51 and a curved cam of the cam ring 72 is moved in the direction of the optical axis to make zooming adjustment.

In manually making the zooming adjustment, when the operating ring 81 is manually rotated, a slip takes place at the transmission torque limiting means because the vibration wave motor requires a large torque for backward driving. Further, even when a force is exerted on the operation ring 71 from outside during the electric driving, a slip takes place at the transmission torque limiting means if the external force exceeds a predetermined torque. Therefore, the mechanism of the fourth embodiment never receives any irrational force. The fourth embodiment is thus arranged to be capable of selectively driving the lens unit 74 either in the manual driving mode or in the electric driving mode without necessitating any mechanism for switching between the manual driving and the electric driving, so that the mechanism of the fourth embodiment can be simply arranged.

According to the arrangement of the fourth embodiment, the rotation torque of the driving means can be reliably transmitted to the driven side in the mode of electrically driving the operation ring 81. In the manual driving mode, with the vibration wave motor or the like which requires a large torque for backward driving employed as the driving means, the operation torque of the operation ring 81 is determined by the rotation torque generated by the transmission torque limiting means and the actuating torque resulting from the lens moving motion of the lens unit 74.

In each of the above-described embodiments a spring is used by way of example as the pushing means for generating a frictional force. However, the use of the spring may be replaced with some other suitable elastic member, such as an O ring or a lip-shaped member made of sponge rubber or neoprene rubber or a leaf spring. It is also possible to use a nonelastic member as the pushing means.

According to the invention, as described in the foregoing, an optical apparatus is arranged such that, in driving an optical means held within a casing either by manually driving an operation ring or by using a power transmission mechanism which transmits the rotation force of an electric motor to the optical means, the optical means can be either manually or electrically driven without any special operation of switching between the electric driving mode and the manual driving mode. The arrangement of the invention has other advantages in that it effectively reduces the adverse effect of backlash and a time lag before the optical means is actually moved, it permits simplification of the mechanism of a torque limiter which limits a transmission torque in the event of overload rotation., it permits reduction in size and simplification of the whole apparatus, the transmission torque is variable as desired, and a torque for a manual operation is also variable with the transmission torque adjusted as desired.

I claim:

1. An optical apparatus comprising:

an optical unit having an optical axis;

a manual operation member arranged to be manually operated to drive said optical unit;

a driving motor for electrically driving said optical unit; and a driven member arranged to be driven by said driving motor, wherein said manual operation member and said driven member are kept in contact with each other through a frictional force on a ring-shaped face whose center lies at the optical axis, and wherein a driving force of said driving motor is transmitted via said driven member to said manual operation member, while a manual driving force onto said manual operation member is not transmitted to said driven member, said apparatus including means for adjusting said frictional force.

2. An optical apparatus according to claim 1, wherein said optical unit is a focusing lens.

3. An optical apparatus according to claim 1, wherein said optical unit is a zooming lens.

4. An optical apparatus according to claim 1, wherein said manual operation member is arranged to rotate around the optical axis, and when said manual operation member is manually operated, said manual operation member is rotated having the predetermined frictional force generated on said ring-shaped face.

5. An optical apparatus according to claim 1, wherein said adjusting means comprises an adjustment member accessible from an exterior surface of said apparatus.

6. An optical apparatus according to claim 1, wherein said driven member has a worm wheel, and said driving motor has a worm, said worm wheel and said worm being coupled with each other to form a worm gear.

7. An optical apparatus comprising:

an optical unit having an optical axis;

a manual operation member arranged to be manually operated to drive said optical unit;

a driving motor for electrically driving said optical unit; and a driven member arranged to be driven by said driving motor, wherein said manual operation member and said driven member are kept in contact with each other through a frictional force on a ring-shaped face whose center lies at the optical axis, and wherein a driving force of said driving motor is transmitted via said driven member to said manual operation member, while a manual driving force onto said manual operation member is not transmitted to said driven member, said apparatus including elastic means for generating said frictional force.

8. An optical apparatus according to claim 7, wherein said elastic means comprises a spring member.

* * * * *

UNITED STATES PATENT AND TRADEMARK OFFICE
CERTIFICATE OF CORRECTION

PATENT NO. : 6,025,964
DATED : February 15, 2000
INVENTOR(S) : Haruhisa Yamamoto It is certified that error appears in the above-identified patent and that said Letters Patent is hereby corrected as shown below:

Col. 1, line 28, delete "switches is" and insert -- switches are --.
Col. 4, lime 31, delete "cuter" and insert -- outer --.

Signed and Sealed this

Seventeenth Day of April, 2001

Attest:

NICHOLAS P. GODICI

Attesting Officer         Acting Director of the United States Patent and Trademark Office